US008006497B2

(12) United States Patent
Nolcheff et al.

(10) Patent No.: US 8,006,497 B2
(45) Date of Patent: Aug. 30, 2011

(54) DIFFUSERS, DIFFUSION SYSTEMS, AND METHODS FOR CONTROLLING AIRFLOW THROUGH DIFFUSION SYSTEMS

(75) Inventors: Nick Nolcheff, Chandler, AZ (US); Dan Frias, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 705 days.

(21) Appl. No.: 12/130,021

(22) Filed: May 30, 2008

(65) Prior Publication Data

US 2009/0293485 A1 Dec. 3, 2009

(51) Int. Cl.
*F02C 1/00* (2006.01)
(52) U.S. Cl. .......................................... 60/751; 60/726
(58) Field of Classification Search .................. 60/726, 60/751; 415/191, 193, 194, 211.2; 313/359.1, 313/362.1
See application file for complete search history.

(56) References Cited

U.S. PATENT DOCUMENTS

| | | | |
|---|---|---|---|
| 6,247,671 B1 | 6/2001 | Saeks et al. | |
| 6,796,532 B2 | 9/2004 | Malmuth et al. | |
| 7,334,394 B2 | 2/2008 | Samimy et al. | |
| 7,870,719 B2 * | 1/2011 | Lee et al. | 60/202 |
| 7,870,720 B2 * | 1/2011 | Hagseth et al. | 60/204 |
| 2005/0034464 A1 * | 2/2005 | Gonzalez | 60/801 |
| 2006/0091731 A1 * | 5/2006 | Haje et al. | 310/11 |
| 2007/0119827 A1 * | 5/2007 | Miller et al. | 219/121.51 |
| 2007/0126292 A1 * | 6/2007 | Lugg | 310/11 |
| 2008/0089775 A1 | 4/2008 | Lee et al. | |
| 2008/0101913 A1 | 5/2008 | Lee et al. | |
| 2008/0115477 A1 | 5/2008 | Samimy et al. | |
| 2009/0065064 A1 * | 3/2009 | Morris et al. | 137/2 |
| 2009/0169362 A1 * | 7/2009 | Wadia et al. | 415/118 |

OTHER PUBLICATIONS

Ruolong MA, et al., Design of a Transonic Research Turbine Facility, American Institute of Aeronautics and Astronautics, 44th AIAA Aerospace Sciences Meeting and Exhibit, Jan. 9-12, 2006, Reno, Nevada.
B. Goksel, et al., Active Flow Control in Turbomachinery Using Phased Plasma Actuators, Institute of Bionics and Evolutiontechnique, TU Berlin, Ackerstr. 71-76, Secr. ACK1, 13355 Berlin, Germany.
J. Reece Roth, et al., Flow Field Measurements of Paraelectric, Peristaltic, and Combined Plasma Actuators Based on the One Atmosphere Uniform Glow Discharge Plasma (OAUGDP), American Institute of Aeronautics and Astronautics.

* cited by examiner

*Primary Examiner* — Michael Cuff
*Assistant Examiner* — Phutthiwat Wongwian
(74) *Attorney, Agent, or Firm* — Ingrassia Fisher & Lorenz, P.C.

(57) ABSTRACT

A diffuser is provided that includes a first wall, a second wall, and a first plasma actuator. The first wall has a radially-extending section and a curved section. The second wall has a radially-extending section and a curved section that are spaced apart from the radially-extending section and the curved section of the first wall such that the curved section of the second wall is disposed radially inwardly from the curved section of the first wall and a flow path is defined therebetween. The first plasma actuator is disposed on the curved section of the second wall, and the first plasma actuator is adapted to generate a first electric field to ionize a first portion of air flowing along the flow path to form a plurality of ionized species capable of inducing a second portion of air to flow in a desired direction.

19 Claims, 4 Drawing Sheets

DIFFUSERS, DIFFUSION SYSTEMS, AND METHODS FOR CONTROLLING AIRFLOW THROUGH DIFFUSION SYSTEMS

TECHNICAL FIELD

The inventive subject matter generally relates to engines, and more particularly relates to diffusers and diffusion systems for use in engines, and methods for controlling airflow through engine diffusion systems.

BACKGROUND

A turbofan gas turbine engine may be used to power aircraft and may include, for example, a fan section, a compressor section, a combustion section, a turbine section, and an exhaust section. The fan section induces air from the surrounding environment into the engine and accelerates a fraction of the air toward the compressor section. The remaining fraction of air is accelerated into and through a bypass plenum, and out the exhaust section.

The compressor section, which may include a high pressure compressor and a low pressure compressor, raises the pressure of the air it receives from the fan section to a relatively high level. The compressed air then enters the combustion section, where a ring of fuel nozzles injects a steady stream of fuel into a plenum. The injected fuel is ignited to produce high-energy compressed air. The air then flows into and through the turbine section causing turbine blades therein to rotate and generate energy. This energy is used to power the fan and compressor sections. The air exiting the turbine section is exhausted from the engine via the exhaust section, and the energy remaining in the exhaust air aids the thrust generated by the air flowing through the bypass plenum.

In some engines, the compressor section is implemented with a centrifugal compressor. A centrifugal compressor typically includes at least one impeller that is rotationally mounted to a rotor and surrounded by a shroud. When the impeller rotates, it compresses and imparts a velocity component to the air received from the fan section. The shroud directs the air radially outward into a diffuser, which decreases a tangential velocity component and the axial velocity component of the air and increases the static pressure of the air. In this regard, the air is directed around a curved section having a relatively small curvature radius defined by an inner wall and an outer wall of the diffuser. The air is then exhausted out an outlet of the diffuser. The exhausted air then may be directed to a deswirl assembly that includes an annular housing having a plurality of straight radially extending vanes, which are used to straighten and further reduce the axial velocity component of the air flow before it enters the combustion section.

Although the aforementioned configuration operates adequately in most circumstances, it may be improved. In particular, as the demand for smaller engines increases, the dimensions of the engine components, such as diffusers, continues to decrease, accordingly. For example, in some diffusers, the curvature radius of the curved section of the diffuser has been designed to be relatively small. However, the smaller curvature radius may cause airflow around the curved section to have a tendency to separate from the inner wall and to flow toward the outer wall. As a result, the diffuser and engine may not operate as efficiently as desired.

Accordingly, there is a need for diffusion systems and methods that may be implemented into smaller dimensioned engines to optimize engine efficiency. Additionally, there is a need for improved diffusers that may effectively flow air between a centrifugal compressor and an annular deswirl assembly without having to redesign surrounding components. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Diffusers, diffusion systems, and methods are provided.

In an embodiment, by way of example only, a diffuser is provided that includes a first wall, a second wall, and a first plasma actuator. The first wall has a radially-extending section and a curved section. The second wall has a radially-extending section and a curved section, where the radially-extending section and the curved section of the second wall are spaced apart from the radially-extending section and the curved section of the first wall such that the curved section of the second wall is disposed radially inwardly from the curved section of the first wall and a flow path is defined therebetween. The first plasma actuator is disposed on the curved section of the second wall, and the first plasma actuator is adapted to generate a first electric field to ionize a first portion of air flowing along the flow path to thereby form a plurality of ionized species capable of inducing a second portion of air to flow in a desired direction.

In another embodiment, by way of example only, a diffusion system for coupling air flow from a centrifugal compressor to an axial combustor is provided. The system includes a diffuser adapted to be in flow communication with the centrifugal compressor. The diffuser includes a first wall having a radially-extending section and a curved section, a second wall having a radially-extending section and a curved section, the radially-extending section and the curved section of the second wall spaced apart from the radially-extending section and the curved section of the first wall such that the curved section of the second wall is disposed radially inwardly from the curved section of the first wall and a flow path is defined therebetween, and a first plasma actuator disposed on the curved section of the second wall, the first plasma actuator adapted to generate a first electric field to ionize a first portion of air flowing along the flow path to thereby form a plurality of ionized species capable of inducing a second portion of air to flow in a desired direction. The system also includes a deswirl assembly in flow communication with the diffuser and adapted to provide air from the diffuser flow path to the axial combustor.

In yet another embodiment, by way of example only, a method is provided for controlling airflow through a diffusion system. The method includes generating a first electric field across a flow path defined between an inner curved wall and an outer curved wall of a diffuser and flowing a first portion of an airflow through the first electric field to transform a portion of the first portion of the airflow into a plurality of ionized species to induce a second portion of the airflow to travel in a first predetermined direction using a portion of the plurality of ionized species.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description. Although the inventive subject matter is, for convenience of explanation, depicted and described as being implemented in a turbofan gas turbine jet engine, it will be appreciated that it can be implemented in various other types of turbines, such as turboshaft engines, and in various other systems and environments.

Figure 1:
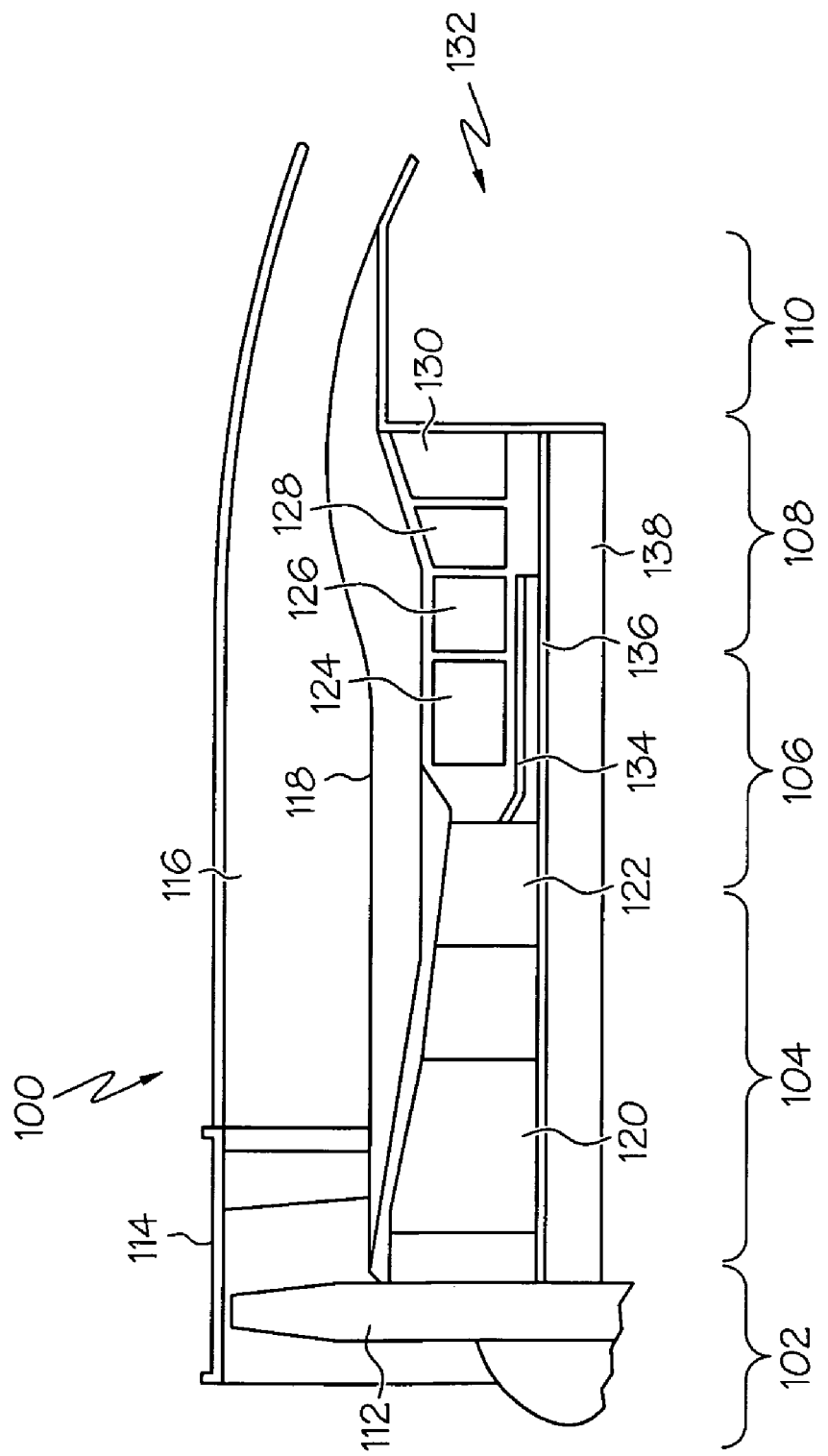
FIG. 1 is a simplified, schematic of a gas turbine engine, according to an embodiment.

FIG. 1 is a simplified, schematic of a gas turbine engine 100, according to an embodiment. The gas turbine engine 100 generally includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 raises the pressure of the air directed into it from the fan 112, and directs the compressed air into the combustion section 106. In the combustion section 106, which includes an annular combustor 124, the high pressure air is mixed with fuel and combusted. The combusted air is then directed into the turbine section 108. The turbine section 108 includes a high pressure turbine 126, an intermediate pressure turbine 128, and a low pressure turbine 130 disposed in axial flow series. The combusted air from the combustion section 106 expands through the turbines 126, 128, 130 causing each to rotate. The air is then exhausted through a propulsion nozzle 132 disposed in the exhaust section 110, providing additional forward thrust. As each turbine 126, 128, 130 rotates, each drives equipment in the engine 100 via concentrically disposed shafts or spools. Specifically, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
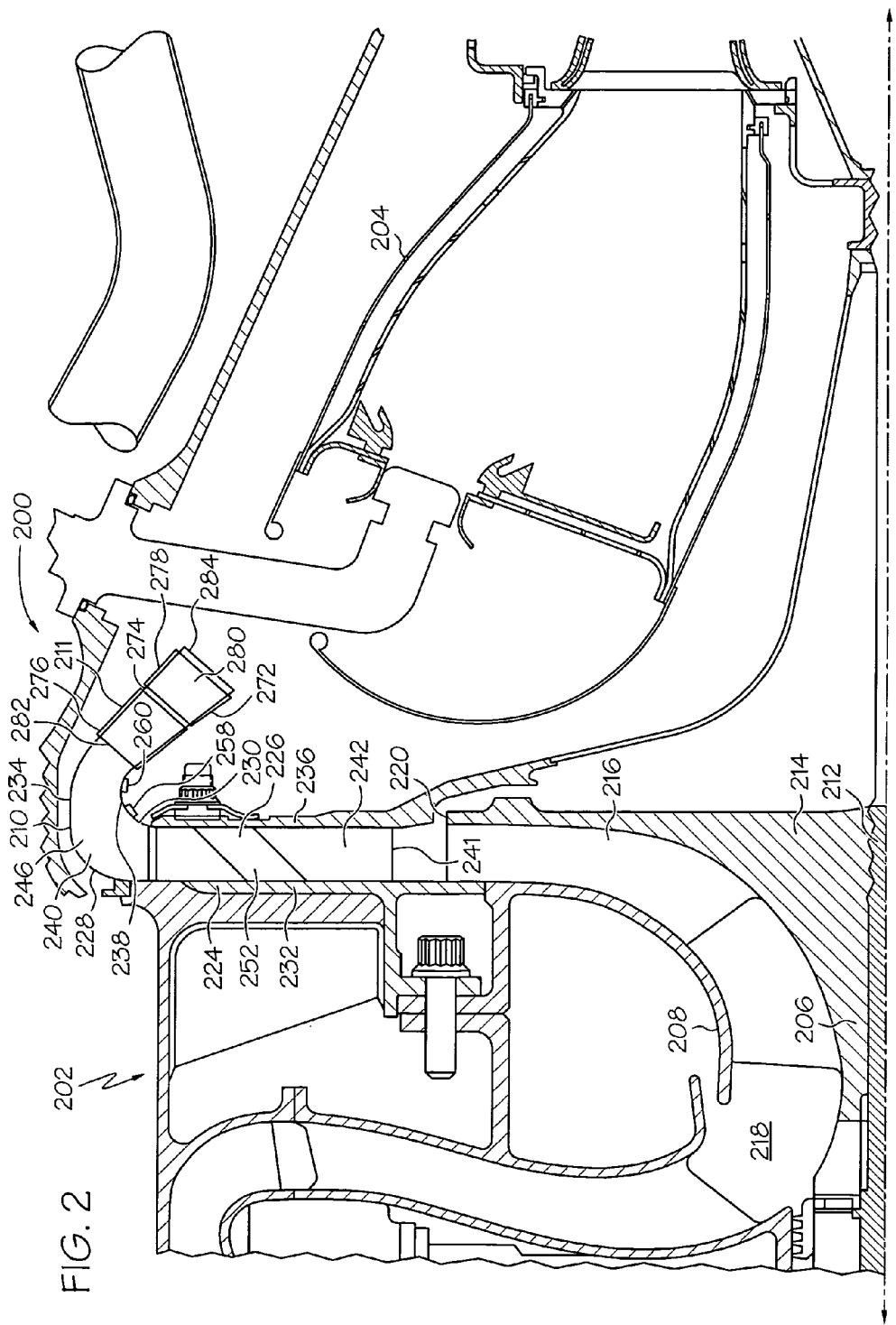
FIG. 2 is a cross section view of a compressor section, according to an embodiment.

FIG. 2 is a cross section view of a compressor section 200, according to an embodiment. The compressor section 200 may include a centrifugal compressor 202, a diffuser 210, and a deswirl assembly 211, in an embodiment. According to an embodiment, the centrifugal compressor 202 may be a two-stage centrifugal compressor, as show in FIG. 2. In other embodiments, the centrifugal compressor 202 may be a single stage centrifugal, an axi-centrifugal or other type of centrifugal compressor. A diffusion system may be implemented into the compressor section 200 that couples air from the centrifugal compressor 202 to an axial combustor 204. In an embodiment, the centrifugal compressor 202 may include an impeller 206 and a shroud 208. In accordance with an embodiment, the impeller 206 is mounted on an output shaft 212, via a hub 214, and is thus rotationally driven by either a turbine (e.g., turbine 126, 128, 130 in FIG. 1) or other driving component, as described above. A plurality of spaced-apart blades 216, only one of which is shown, extend radially outwardly from the hub 214 and are partially surrounded by the shroud 208. When the impeller 206 is rotated, the blades 216 draw air into an annular inlet duct 218 towards the impeller 206 to increase the velocity of the air to a relatively high velocity. The relatively high velocity air is then discharged from the impeller 206 into the diffuser 210.

The diffuser 210 may be in flow communication with the centrifugal compressor 202 and may be a radial vane diffuser that is disposed adjacent to, and surrounds a portion of, the impeller 206, in an embodiment. The diffuser 210 is configured to intake a flow of compressed air traveling in a direction having a radial velocity component and to direct the air to a diffused annular flow path 240 having a flow direction with a tangential velocity component. The diffuser 210 additionally reduces the velocity of the air and increases the pressure of the air. According to an embodiment, the diffuser 210 includes a housing 224, a plurality of diffuser vanes 226, and one or more plasma actuators 258, 260.

The housing 224 is made up of at least a first wall 228 having a radially-extending section 232 and a curved section 234, and a second wall 230 having an radially-extending section 236 and a curved section 238. The two walls 228, 230 are spaced apart to define the flow path 240 therebetween. The radially-extending sections 232, 236 of the walls 228, 230 may define a radial flow section 242 of the flow path 240 that extends substantially radially outward from an inlet 241 of the diffuser 210. In an embodiment, the radial flow section 242 of the flow path 240 may have a radial length in a range of between about 2.5 cm to about 10.0 cm and an axial width in a range of between about 0.5 cm to about 2.0 cm. In other embodiments, the length and width ranges may be larger or smaller, depending on the dimensions of surrounding components.

The curved sections 234, 238 of the walls 228, 230 may define a transitional flow section 246 of the flow path 240. In particular, the curved section 234 of the first wall 228 may define an outer diameter of the diffuser 210 and may be positioned as an outer wall, and the curved section 238 of the second wall 230 may be disposed radially inwardly from the curved section 234 of the first wall 228 as an inner wall along the transitional flow section 246. The transitional flow section 246 is configured to redirect air flowing in a first radial direction from the radial flow section 242 to a second radial direction by imparting an axial velocity component to the air flow. In this regard, the transitional flow section 246 may have a relatively small curvature radius. In an example, the curvature radius of the curved section 238 may be between about 0.38 cm and about 1.52 cm. In other embodiments, the curvature radius may be smaller or larger than the aforementioned ranges depending on a location at which the air is to be exhausted from the diffuser 210. However, in other embodiments, the lengths may be longer or shorter.

To direct the air flow through the diffuser 210, the plurality of diffuser vanes 226 and one or more plasma actuators 258 are coupled to the diffuser housing 224. In an embodiment, the plurality of diffuser vanes 226, only one of which is shown in FIG. 2, are disposed in the radial flow section 242. The plurality of diffuser vanes 226 may define a plurality of diffusion flow passages 252 through the radial flow section 242, which improved distribution of the air circumferentially around the diffuser 210. The diffuser vanes 226 may be arranged tangentially relative to a trailing edge 220 of the impeller 206. In an embodiment, the diffuser vanes 226 may alternatively be arranged at an angle relative to the trailing edge 220 of the impeller 206.

The plasma actuator 258 improves control of the airflow through the diffuser flow path 240, and may be especially effective when implemented into diffuser flow paths having relatively small dimensions. In this regard, the plasma actuator 258 is adapted to generate an electric field across a designated area of the diffuser flow path 240 such that when air flows through the electric field, a first portion thereof ionizes to become a plurality of ionized species, which may include positively and negatively charged species. The plurality of ionized species may be capable of inducing a second portion of the air to flow in a desired direction, by attracting charged particles therein to the designated area of the diffuser flow path 240.

According to an embodiment, the designated area may be a location in the diffuser flow path 240 at which flow separation from one or both of the walls 228, 230 may occur. For example, the air may have difficulty turning around the curved section 238 of the second, inner wall 230 of the diffuser 210 and may tend to travel radially outwardly toward the first, or outer wall 228. Thus, the plasma actuator 258 may be implemented in the second, inner wall 230. In an embodiment, the plasma actuator 258 may be disposed at a location on the curved section 238 at which flow separation may begin to occur. In an example, flow separation may begin to occur at a halfway point in the transitional flow section 246; thus, the plasma actuator 258 may be disposed on the curved section 238 at the halfway point. In other embodiments, the plasma actuator 258 may be disposed at a different location, however the particular location may depend on particular configurations and dimensions of the first and second walls 228, 230.

Moreover, although a single plasma actuator 258 is described above, a second plasma actuator 260 (shown in phantom) may be included in some embodiments. The first and second plasma actuators 258, 260 may be disposed in axial flow series relative to each other. In an embodiment, the first plasma actuator 258 may be disposed at first axial location on the curved section 238, and the second plasma actuator 260 may be disposed at a second axial location on the curved section 238 downstream from the first axial location. The second plasma actuator 260 may be adapted to provide a second electric field across another desired area of the flow path 240. For example, the first plasma actuator 258 may be disposed at a beginning of the transitional flow section 246, and the second plasma actuator 260 may be disposed toward an end of the transitional flow section 246. In other embodiments, more than two plasma actuators may be included in a diffuser.

In any case, after the air is directed through the transitional flow section 246 of the flow path 240, it may be directed towards the deswirl assembly 211, in an embodiment. The deswirl assembly 211 is configured to substantially remove swirl from air received therefrom, to thereby decrease a magnitude of the velocity of the air flow before directing the air to the axial combustor 204. The deswirl assembly 211 includes an inner annular wall 272, an outer annular wall 274, and vanes 276, 278 disposed therebetween, in an embodiment. The walls 272, 274 define a flow path 280 that is configured to redirect the air from its radially outward direction to a radially inward and axially downstream direction. In this regard, the walls 272, 274 are formed such that the flow path 280 extends between an inlet 282 and outlet 284 so that when the air exits the outlet 284, it is directed at an angle and toward the annular combustor 204.

Figure 3:
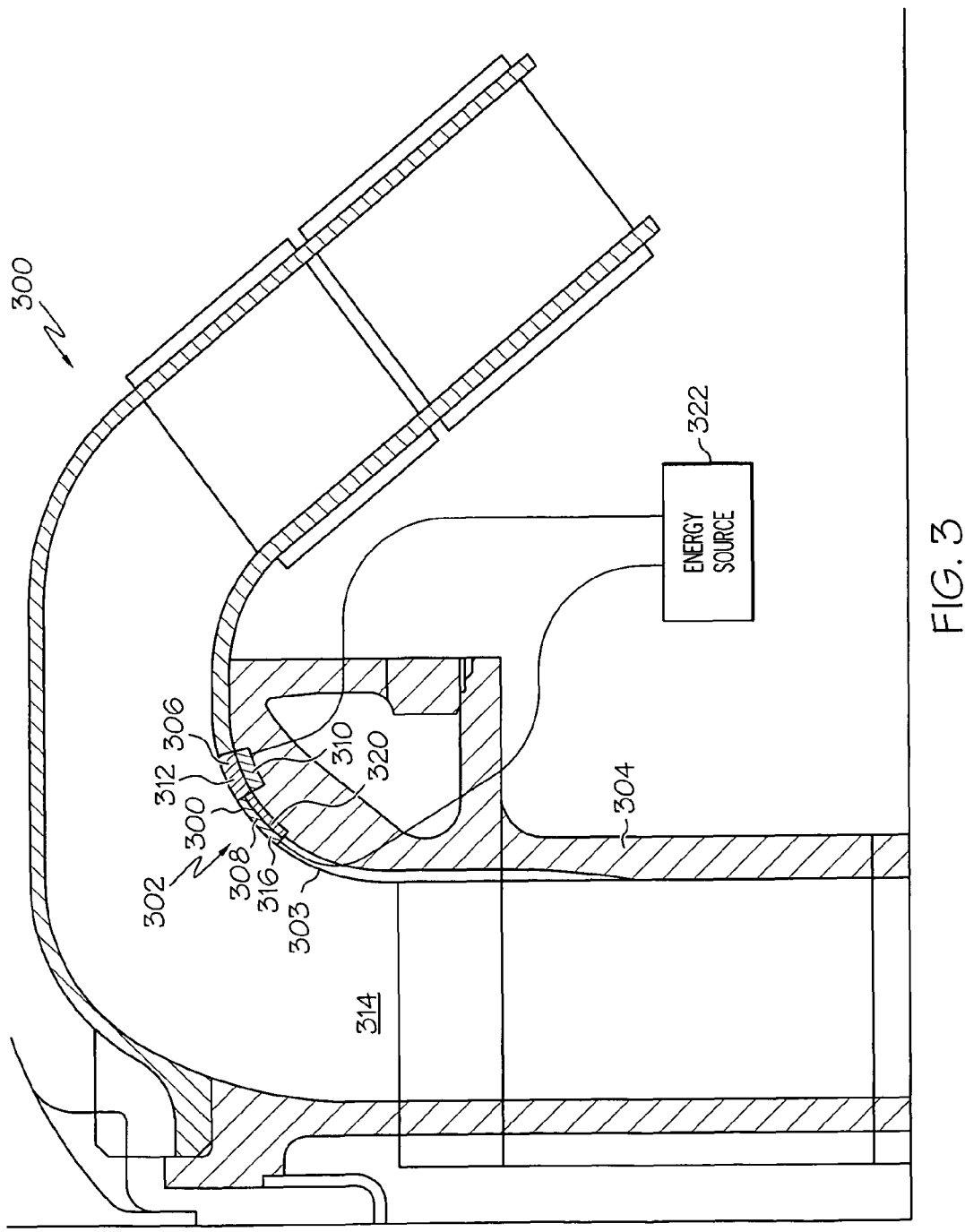
FIG. 3 is a close-up view of a portion of a diffuser, according to an embodiment.

Turning now to FIG. 3, a close up view of a portion of a diffuser 300 including a plasma actuator 302 is illustrated, according to an embodiment. In an example, the plasma actuator 302 may include a dielectric component 306 and a pair of electrodes 308, 310. The dielectric component 306 may be disposed in a curved section 303 of an inner wall 304 of the diffuser 300 and may include a first side 312 and a second side 320, each side including an electrode 308, 310 disposed thereon. The dielectric component 306 may include a dielectric material that may provide a desired resistance when energy is supplied to the electrodes 308, 310 to form an electric field, where the desired resistance has a magnitude that is sufficient to cause arcing upon generation of the electric field, in an embodiment. In another embodiment, the dielectric material may be capable of maintaining structural integrity when exposed to temperatures of in a range of from about 175° C. to about 595° C.

To provide the electric field around a circumference of the diffuser inner wall 304, the dielectric component 306 may be configured as a sleeve, in an embodiment. For example, the dielectric component 306 sleeve may be disposed in a ring-shaped cutout formed through the inner wall 304 of the diffuser 300 and may be mounted thereto. In an embodiment, the dielectric component 306 sleeve may be bolted, screwed into, adhered, or otherwise attached to the inner wall 304 of the diffuser 300. In another embodiment, the dielectric component 306 may be integrally formed as part of the diffuser 300. For example, the inner wall 304 may be formed around at least a portion of the dielectric component 306 sleeve such that a portion thereof is embedded in the inner wall 304. In an embodiment, the sleeve may include a plurality of tabs that are embedded into the inner wall 304. The dielectric component 306 may be a continuous piece of dielectric material. In another example, the dielectric component 306 may include a plurality of pieces of dielectric material that are disposed adjacent to one another to form a ring. The plurality of pieces may be equally spaced apart from each other or each piece may be disposed adjacent to two other pieces circumferentially around the inner wall 304. In embodiments in which the diffuser 300 may have a limited allowable footprint within the engine, the dielectric component 306 may have a thickness that is substantially equal to or less than the thickness of the inner wall 304. In other configurations in which the dimensions of the diffuser 300 may be larger or smaller, the dielectric component 306 may be thicker or thinner.

As mentioned briefly above, the first electrode 308 is disposed on the first side 312 of the dielectric component 306. In this regard, the first electrode 308 may be exposed to the air to be ionized within a diffuser flow path 314. In an embodiment, the first electrode 308 is configured such that flow disruption along the flow path 314 is minimized. For example, the first electrode 308 may be a ribbon of conductive material that may be attached to a surface of the first side 312 of the dielectric component 306. The first electrode 308 may extend around a circumference of the dielectric component 306 and may have a thickness that is less than a thickness of the inner wall 304. In another embodiment, a shallow groove 316 for receiving the electrode 308 may be formed around the circumference of the surface of the first side 312 of the dielectric component 306 and may be configured to allow an exposed surface of the first electrode 308 to remain flush with adjacent surfaces of the first side 312 of the dielectric component 306. In another embodiment, the first electrode 308 may be made up of a plurality of conductive ribbons of materials, disposed circumferentially around the first side 312 of the dielectric component 306. For example, in an embodiment, the ribbons of materials may be substantially identical in dimensions.

Alternatively, the ribbons of materials may not be identical in dimensions and/or may have dimensions that are larger or smaller than the above-given ranges.

The second electrode 310 may be disposed on the second side 320 of the dielectric component 306 opposite the first side 312 and outside of the diffuser flow path 314. In an embodiment, the second electrode 310 is disposed axially downstream relative to the first electrode 308, as shown in FIG. 3. In other embodiments, the electrodes 308, 310 may be aligned with each other and disposed at substantially the same axial location on the dielectric component 306. In still another embodiment, the second electrode 310 may be located upstream from the first electrode 308. Because the second electrode 310 is not exposed to the air in the flow path 314, the second electrode 310 may have any suitable configuration for producing the electric field across the flow path 314. In an embodiment, the second electrode 310 may include a ribbon of conductive material that is attached to an inner diameter of the dielectric component 306. In other embodiments, the second electrode 310 may be thicker or thinner. In still another embodiment, the second electrode 310 may include a plurality of conductive ribbons of materials, disposed circumferentially around the second side 320 of the dielectric component 306. For example, in an embodiment, the ribbons of materials may be substantially identical in dimensions. Alternatively, the ribbons of materials may not be identical in dimensions and/or may have dimensions that are larger or smaller than the above-give ranges.

In one embodiment, the first and second electrodes 308, 310 may have substantially similar configurations and may be made of substantially similar materials. According to another embodiment, the first and second electrodes 308, 310 may be made of different materials and/or may have different configurations. In any case, each electrode 308, 310 is electrically coupled to an energy source 322 that is adapted to provide a current thereto. For example, the energy source 322 may be an alternating current power supply. In another example, the energy source 322 may be a direct current power supply. In either embodiment, the energy source 322 may be located locally, such as adjacent to the diffuser 300, or may be located remotely. In an embodiment, the energy source 322 may be the engine 100 (FIG. 1).

Figure 4:
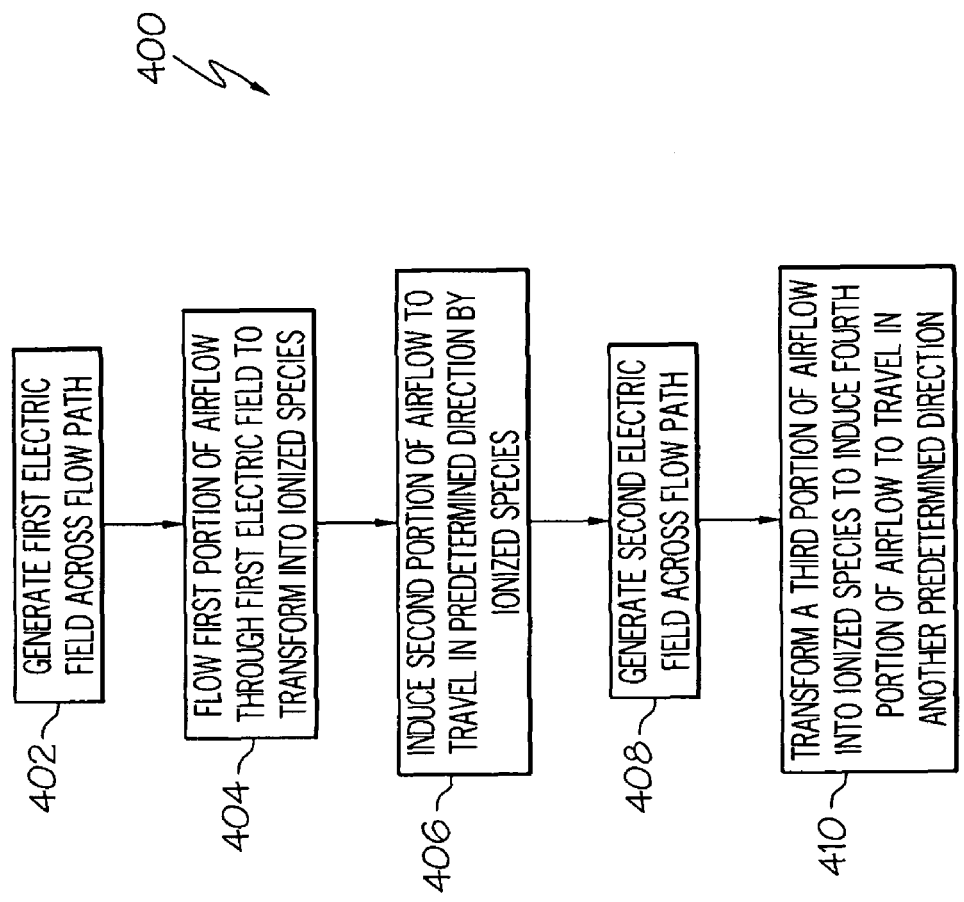
FIG. 4 is a flow diagram of a method of controlling airflow through a diffuser system.

A plasma actuator (e.g., plasma actuators 158, 160 in FIG. 1 or 302 in FIG. 3) may be operated according to a method 400 to control airflow through a diffuser system shown in a flow diagram in FIG. 4, according to an embodiment. Here, an electric field is generated across a flow path defined between an inner curved wall and an outer curved wall of a diffuser of the diffuser system, step 402. In an embodiment, the electric field is generated by providing current to a plasma actuator that is implemented into the inner curved wall. For example, the plasma actuator may be configured similarly to the plasma actuators 258, 302 shown in FIGS. 2 and 3 above and may be comprised of a dielectric component, a first electrode, and a second electrode disposed on either side of the dielectric component. The electrodes may be electrically coupled to an energy source, which may provide current thereto. Thus, when a sufficient amount of current is supplied to the electrodes, an electric field may be formed therebetween.

A first portion of an airflow is flowed through the electric field and transformed into a plurality of ionized species, step 404. In an embodiment, the first portion of the airflow may flow from a centrifugal compressor into the diffuser. In particular, the airflow may be directed through a radial flow section of the flow path, in an embodiment. To transform a portion of the airflow into the plurality of ionized species, a first magnitude of current is supplied to the electrodes generating the electric field while the air flow is flowed through the electric field. The first magnitude of current may be sufficient to arc through the first portion of the air flow traveling over the plasma actuator to thereby initiate ionization of the air to form the plurality of ionized species. In an embodiment, the plurality of ionized species may include positively and negative charged particles. After arcing occurs, a second magnitude of current, which may be less than the first magnitude of current, may be supplied to the electrodes to continue transforming air flowing over the plasma actuator into ionized species. In an embodiment, ionization may be limited to a region of the electric field having a greatest potential gradient. In another embodiment, ionization may occur adjacent to the electrode having a surface exposed to the air.

A second portion of the airflow is induced to travel in a first predetermined direction by a portion of the plurality of ionized species, step 406. To induce the airflow to travel in the predetermined direction, the plurality of ionized species may introduce velocity components to the second portion of the air flow, due to the presence of positive and/or negative charges that may be present therein which may interact with or react to the present of the positive and/or negative charges in the plurality of ionized species.

In one embodiment, a second electric field may be generated at a second axial location along the flow path downstream from the first electric field, step 408. A third portion of the airflow flowing through the second electric field may transform into a second plurality of ionized species having positively- and/or negatively-charged particles, which may induce a fourth portion of the airflow to flow in another predetermined direction, step 410. In an embodiment, steps 402, 404, 406, 408, and 410 may occur simultaneously.

Diffusers, diffusion systems, and methods have now been provided that may be implemented into smaller dimensioned engines to optimize engine efficiency. Additionally, improved diffusers have been provided that may effectively flow air between a centrifugal compressor and an annular deswirl assembly without having to redesign surrounding components.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A diffuser disposed between a centrifugal compressor and a combustor, comprising:
   a first wall of the diffuser having a radially-extending section and a curved section;
   a second wall having a radially-extending section and a curved section, the radially-extending section and the curved section of the second wall spaced apart from the radially-extending section and the curved section of the first wall such that the curved section of the second wall is disposed radially inwardly from the curved section of the first wall and a flow path is defined therebetween; and a first plasma actuator disposed on the curved section of the second wall, the first plasma actuator adapted to generate a first electric field to ionize a first portion of air flowing along the flow path to thereby form a plurality of ionized species capable of inducing a second portion of air to flow in a desired direction.

2. The diffuser of claim 1, wherein the first plasma actuator comprises:
a dielectric component disposed in the curved section of the second wall, the dielectric component having a first side and a second side;
a first electrode disposed on the first side of the dielectric component; and
a second electrode disposed on the second side of the dielectric component.

3. The diffuser of claim 2, wherein:
the second wall includes a cutout formed therein, and
the dielectric component is disposed in the cutout.

4. The diffuser of claim 2, wherein:
the second wall includes a ring-shaped cutout formed therein, and
the dielectric component comprises a sleeve disposed in the ring-shaped cutout.

5. The diffuser of claim 2, wherein:
the dielectric component is coupled to the second wall.

6. The diffuser of claim 2, wherein:
the dielectric component comprises a continuous piece of dielectric material.

7. The diffuser of claim 1, wherein the first plasma actuator is disposed at a first axial location on the curved section of the second wall, and the diffuser further comprises:
a second plasma actuator disposed at a second axial location on the curved section of the second wall downstream from the first axial location, the second plasma actuator adapted to produce a second electric field across the flow path.

8. A diffusion system for coupling an air flow from a centrifugal compressor to an axial combustor, the system comprising:
a diffuser for receiving the airflow from the centrifugal compressor, the diffuser including:
a first wall having a radially-extending section and a curved section,
a second wall having a radially-extending section and a curved section, the radially-extending section and the curved section of the second wall spaced apart from the radially-extending section and the curved section of the first wall such that the curved section of the second wall is disposed radially inwardly from the curved section of the first wall and a flow path is defined therebetween, and
a first plasma actuator disposed on the curved section of the second wall, the first plasma actuator adapted to generate a first electric field to ionize a first portion of air flowing along the flow path to thereby form a plurality of ionized species capable of inducing a second portion of air to flow in a desired direction; and
a deswirl assembly in flow communication with the diffuser to provide the airflow from the diffuser flow path to the axial combustor.

9. The system of claim 8, wherein the first plasma actuator comprises:
a dielectric component disposed in the curved section of the second wall, the dielectric component having a first side and a second side;
a first electrode disposed on the first side of the dielectric component; and
a second electrode disposed on the second side of the dielectric component.

10. The system of claim 9, wherein:
the second wall includes a ring-shaped cutout formed therein, and
the dielectric component comprises a sleeve disposed in the ring-shaped cutout.

11. The system of claim 9, wherein:
the dielectric component is coupled to the second wall.

12. The system of claim 8, wherein the first plasma actuator is disposed at a first axial location on the curved section of the second wall, and the diffuser further comprises:
a second plasma actuator disposed at a second axial location on the curved section of the second wall downstream from the first axial location, the second plasma actuator adapted to produce a second electric field across the flow path.

13. The system of claim 8, wherein the deswirl assembly includes an annular housing and a plurality of vanes, the annular housing comprising an inner annular wall, an outer annular wall disposed concentric to the inner annular wall, and a flow path defined therebetween, and the plurality of vanes is disposed in the flow path.

14. A method of controlling an airflow through a diffusion system that disposed between a centrifugal compressor and an axial combustor, the method comprising the steps of:
generating a first electric field across a flow path defined between an inner curved wall and an outer curved wall of a diffuser; and
flowing a first portion of the airflow through the first electric field to transform a portion of the first portion of the airflow into a plurality of ionized species to induce a second portion of the airflow to travel in a first predetermined direction using a portion of the plurality of ionized species.

15. The method of claim 14, further comprising:
flowing the airflow from a centrifugal compressor to the diffuser.

16. The method of claim 14, further comprising:
flowing the airflow through a radial flow section of the flow path before the step of flowing a first portion of an airflow through the electric field.

17. The method of claim 14, further comprising:
directing the airflow from the diffuser to a deswirl assembly.

18. The method of claim 14, wherein the step of generating a first electric field comprises generating the first electric field at a first axial location of the flow path, and the method further comprises the steps of:
generating a second electric field across a second axial location of the flow path; and
flowing the airflow through the second electric field to transform a third portion of the airflow into a second plurality of ionized species to induce a fourth portion of the airflow to travel in a second predetermined direction.

19. The method of claim 14, wherein the step of generating a first electric field comprises:
supplying a first magnitude of current to cause arcing through the first portion of the airflow to thereby initiate ionization; and
supplying a second magnitude of current that is less than the first magnitude of current to continue ionization.

* * * * *